United States Patent [19]
Morino

[11] 3,829,874
[45] Aug. 13, 1974

[54] INTERLOCK MECHANISM INTERLOCKING CAMERA SHUTTER WITH A DOUBLE-FRAME FILM ADVANCE PREVENTION APPARATUS

[75] Inventor: Yukio Morino, Tokyo, Japan
[73] Assignee: Seiko Koki Kabushiki Kaisha, Tokyo, Japan
[22] Filed: Oct. 10, 1972
[21] Appl. No.: 296,091

[30] Foreign Application Priority Data
Oct. 11, 1971 Japan.............................. 46-80030

[52] U.S. Cl................................................ 95/31 R
[51] Int. Cl. ............................................ G03b 19/04
[58] Field of Search ......................................... 95/31

[56] References Cited
UNITED STATES PATENTS
| | | | |
|---|---|---|---|
| 2,104,094 | 1/1938 | Nerwin | 95/31 |
| 2,148,636 | 2/1939 | Muller | 95/31 |
| 2,364,466 | 12/1944 | Nagel | 95/31 |

Primary Examiner—John M. Horan
Attorney, Agent, or Firm—Robert E. Burns; Emmanuel J. Lobato; Bruce L. Adams

[57] ABSTRACT

Apparatus preventing a double-frame advance of the film thereby precluding successive film frames from being wound without taking an exposure on each frame. A film-advance enabling lever is actuated from a rest position in which it releases the film advance or wind mechanism of the camera. The film-advance enabling lever is actuated by a shutter-cocking lever which is actuated by advancing the camera film one frame with the camera wind or advance lever which likewise charges or cocks the shutter. An interlock is actuated by the film-advance enabling lever locking the shutter in a charged state when the shutter-cocking lever, actuated upon advancement of the film, is restored to its rest position. The interlock locks the film-advance enabling lever in an operative position thereof and is itself released by the shutter-release lever when the shutter-release button is depressed. A shutter-release plate or lever temporarily retains the film-advance enabling lever from being completely restored to its rest position so that it precludes enabling of film advancing until it is completely restored to its rest position at which time it releases the film-advancing mechanism and releasably locks the shutter-release lever in position, so that an exposure cannot be taken until the next successive film-advance or take up has taken place.

2 Claims, 4 Drawing Figures

PATENTED AUG 13 1974

INTERLOCK MECHANISM INTERLOCKING CAMERA SHUTTER WITH A DOUBLE-FRAME FILM ADVANCE PREVENTION APPARATUS

BACKGROUND OF THE INVENTION

This invention relates generally to cameras and more particularly to apparatus for precluding double-frame film take ups without successive exposures thereof and an interlock therefor interlocking it with the camera shutter.

In known cameras the shutter operating mechanism is utilized for releasing the film advance or take up mechanism to enable advancing of the individual frames of film for taking of successive exposures. Since the movement of the shutter opening and closing mechanism is utilized for effecting the release of the film advance apparatus, there is an effect on the shutter exposure time.

Moreover, in the known camera film advance apparatus, the synchronization of the release of the film wind or advance elements in connection with the other camera operations or functions is quite difficult. It is possible in the known apparatus to advance several film frames without taking an exposure thereby wasting film. Moreover, the accuracy of the timing of the shutter is made quite difficult and substantially impossible.

SUMMARY OF THE INVENTION

It is a principal object of the present invention to provide an apparatus preventing double-frame film advances without taking exposure on each of the frames.

Another object is to provide apparatus by which the camera film-advance mechanism is locked and then released without any affect on the shutter operating mechanism and free of any affect thereon.

In accordance with the invention a camera having a shutter operating mechanism for opening and closing the shutter is operable to a charged in readiness for taking an exposure and has a shutter-release plate or lever in a conventional manner. Apparatus enabling the advancing of single frames of film intermittently and successively and precluding double-frame or multi-frame advances comprises a film-advance enabling lever which is disposed in a rest position in which it releasably locks the shutter-release lever and the camera film-advance mechanism is in a released state. A shutter-cocking lever operated by the film wind lever, when it is actuated, engages the film-advance enabling lever and moves it along with its own movement, while it charges the shutter-operating mechanism. An interlock is actuated by the film-advance enabling lever and the interlock locks the shutter-operating mechanism in a charged condition, while the shutter-cocking lever actuated upon advancing of the film is restored to its initial position. The interlock is provided with another lock that releasably locks the film-advance enabling lever in a position in which it is held until the shutter-release lever is actuated and actuates it to release the shutter drive and the film-advance enabling lever. The shutter-release lever temporarily stops the return movement of the film-advance enabling lever to its rest position so that the film-advancing mechanism is not released until the film-advance enabling lever is restored to its initial or rest position and the double-frame advances are accordingly precluded.

Figure 1:
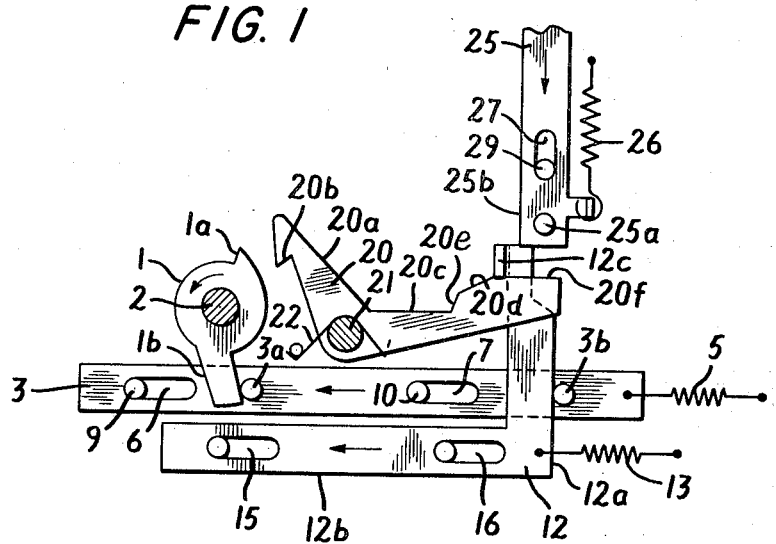
FIG. 1 is a diagrammatic elevation view of a camera multiframe film advance prevention apparatus according to the invention.

Other objects and advantages of the apparatus according to the invention will appear from the following description of an example of the invention and the novel features will be particularly pointed out in the appended claims.

DESCRIPTION OF THE PREFERRED EMBODIMENT

As illustrated in the drawing, a selfcocking shutter-operating mechanism is provided with a plate 1 mounted on a rotatable shaft 2. The plate 1 is provided with a hook 1a and a projection 1b. The shutter-operating means is constantly biased in a counterclockwise direction as illustrated by an arrow on the plate 1. A shutter-cocking lever 3 is provided and is connected to the film advance mechanism of the camera, not shown. When the film wind or advance lever, not shown, is actuated the shutter-cocking lever 3 is moved in the direction toward the left as shown by an arrow so that a pin 3a thereon engages the projection 1b of the shutter-operating mechanism plate 1 and moves it in a clockwise direction cocking or charging the shutter. The shutter-cocking or setting lever 3 is constantly biased to a rest position, shown in FIG. 1, by a spring 5 and is provided with elongated slots 6,7 through which fixed guide-and-stop pins 9,10 extend maintaining the shutter-cocking lever in its rest position as illustrated in the drawing against the force of the bias of the spring 5 and limiting its travel in opposite directions.

As the setting lever 3 is moved, toward the left, to charge the shutter, during a film advance operation, a second pin 3b thereon engages an arm 12a film-advance enabling or control lever 12 and moves it along in the direction of movement thereof as shown by a corresponding arrow in FIG. 1. The film-advance enabling lever 12 is constantly biased, toward the right, to a rest position by a spring 13 and is provided with elongated slots 15,16, on a second arm 12b, through which fixed guide-and-stop pins, 17,18 extend retaining the film-advance enabling lever 12 in its rest or initial position as illustrated in FIG. 1. When the shutter-cocking lever is actuated and moves the film-advance enabling lever 12 to the left the stop pins 9,10 stop it in a position illustrated in FIG. 2.

An interlock or interlocking lever 20 pivotally mounted on a pivot 21 is provided with an arm 20a, provided with a hook 20b and with a second arm 20c. The interlocking lever is biased in a counterclockwise direction by a spring 22 and is held in a rest position by a tab 12c of the film-advance enabling lever 12, which is at 90° to the plane of the drawing. The interlocking lever 20 is provided with a first bevelled surface 20d merging with a second bevelled surface 20e. When the film-advance enabling lever 12 is moved to the position illustrated in FIG. 2 it slides along the first bevelled surface 20d allowing the interlocking lever 20 to be rotated in a counterclockwise direction toward hooking its hook 20b onto the hook 1a of the shutter-operating mechanism for locking the shutter in a charged state. The tab 12c on the film-advance enabling lever 12 moves into position engaging the second bevelled surface 20e of the interlock and is releasably locked in this position of travel so that its spring 13 cannot restore it to its initial rest position. At this point the two hooks 1a, 20b engage and the shutter is interlocked with or coupled to the film-advance mechanism of the camera. The shutter-cocking lever 3, however, is free to be restored to its rest position by its biasing spring 5 and this restoration takes place during the second half of the movement of the film-advance mechanism.

Figure 2:
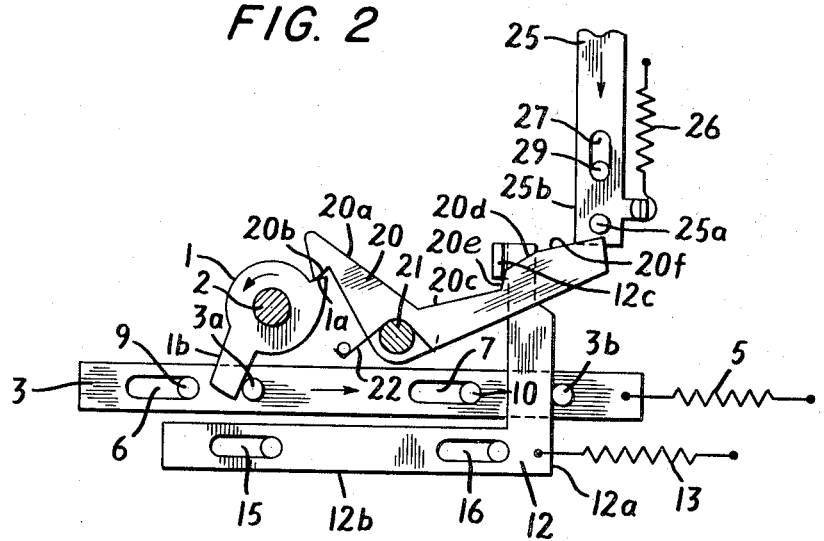
FIG. 2 is a diagrammatic view of the apparatus in FIG. 1, illustrating a condition in which the shutter is charged and a film advance enabling lever has been actuated to an operative position for actuating an interlock mechanism, interlocking the shutter and the double-frame film advance prevention apparatus.
Figure 3:
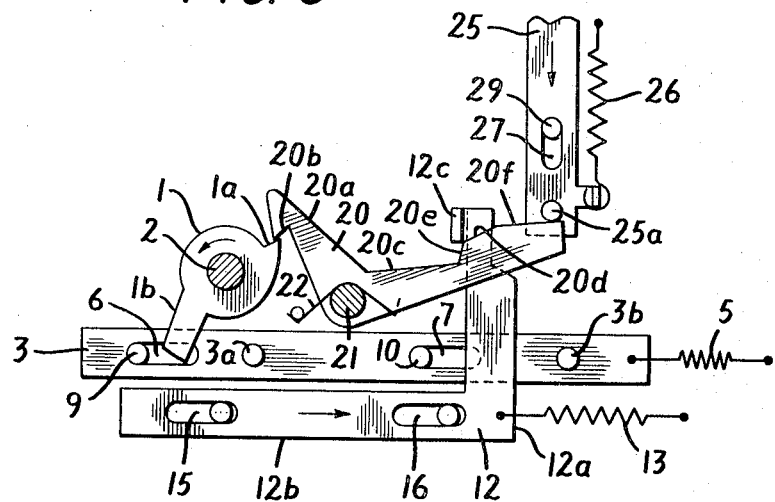
FIG. 3 is a diagrammatic elevation view of the apparatus in FIG. 3, illustrating a condition in which the advance of a film has been completed and the camera is in readiness for taking an exposure.

The film-advance enabling lever 12 has its arm 12a disposed, when in a rest position, in the path of travel of a shutter-release lever 25, biased upwardly by a spring 26, provided with a longitudinal slot 27 within which a fixed guide-and-stop pin 29 is disposed for guiding and limiting longitudinal movement of the lever. The shutter-release lever 25 is provided with a pin 25a functioning as hereinafter described and has an end surface that bears on the end of the upright arm 12a of the film-advance enabling lever 12 which is in the path of travel of the shutter-release lever and releasably retains it, when in its rest position, as illustrated in FIG. 1, precluding taking of an exposure. When the film-advance enabling lever 3 is moved to its position illustrated in FIG. 2 it is clear of the path of movement of the shutter-release lever 25 so that when it is depressed for taking an exposure, as illustrated in FIGS. 2 and 3, its pin 25a engages a surface 20f of the interlock lever 20 and rotates it to the position illustrated in FIG. 3 in which it partially retracts it from engagement with the shutter-operating mechanism. As this is accomplished the tab 12c on the film-advance enabling lever 3 rides up from the first bevelled surface 20d as its biasing spring 13 tends to restore it to its rest position and the interlock is further turned in the clockwise direction so that the shutter is released and an exposure can be taken under control of the shutter timing circuit, not shown, free of any interference from the film-advancing mechanism of the camera.

Figure 4:
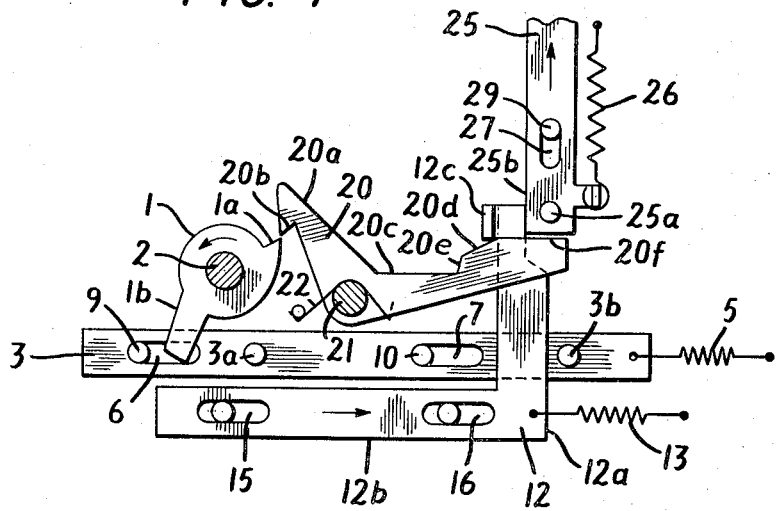
FIG. 4 is a diagrammatic elevation view of the apparatus in FIG. 3, illustrating a condition in which the shutter is released for taking an exposure and the film-advance enabling lever is temporarily retained from returning to its initial rest state for enabling advance of the next successive film frame.

The film-advance enabling lever 12 is temporarily restrained from being restored to its rest position by engaging a side 25b of the shutter-release lever 25, which has not yet been restored to its rest position as illustrated in FIG. 4. This precludes the film-advance enabling lever from releasing the film advance mechanism until it itself is released by the shutter-release lever and it returns to its initial position. When it is fully released by the shutter-release lever the film-advance enabling lever is fully restored and thereby releases the film-advance means of the camera.

Thus, it can be seen that the apparatus described precludes a double-frame film advance or multi-frame film advances and provides an interlock mechanism that allows the shutter to operate freely of the film-advance mechanism so that the timing of an exposure is absolutely dependent solely upon the timer without any other extraneous affect thereon by the film-advance mechanism. The shutter is thereby operated free of vibration and inaccuracies in time delay exposures.

Those skilled in the art will understand that in the condition illustrated in FIG. 1 the film-advance mechanism, not shown, is in a released state and is locked when the cocking lever 3 is restored in advance of the restoration of the film-advance enabling lever. When the latter lever is subsequently restored it then releases the film-advancing mechanism, not shown. The various elements of the film-advance mechanism cooperative with the shutter-cocking lever and the film-advance enabling lever are well known and are not shown. Moreover, the apparatus described prevents double exposures.

What I claim and desire to secure by Letters Patent is:

1. In a camera having shutter-opening means operable to a charged condition in readiness for driving a shutter and taking of an exposure and shutter-release means for taking exposures, apparatus for controlling advancing of single frames of film intermittently and successively and precluding advancing of two successive frames of film without taking of an exposure on an advanced frame before the next successive frame of film is advanced comprising; a shutter-cocking lever operable by film-advancing mechanism of the camera from a rest position to a second position for charging said shutter-operating means, means constantly biasing said shutter-cocking lever to said rest position for restoring it thereto, a film-advance control lever controlling advancing of an individual film frame by said film-advancing mechanism of the camera at a rest position thereof in the path of said shutter-release means for disenabling said shutter-release means and actuated by said shutter-cocking lever during travel thereof for movement out of the path of said shutter-release means to allow taking of photographic exposures, an interlock lever controlled by said film-advance control lever for releasably locking said shutter-operating means and releasably locking said film-advance control lever in a position allowing actuation of said shutter-release means and desenabling the film-advance mechanism, and said shutter-release means having means for engaging said interlock lever when an exposure is taken for causing it to release said shutter-operating means and said film-advance control lever so that said film-advance mechanism of the camera is enabled when said film-advancing lever is restored to said rest position, and means constantly biasing said film-advance control lever to said rest position thereof for restoring it to said rest position.

2. In a camera according to claim 1, in which, said shutter-release means comprises a lever having a surface engaged by said film-advance control lever for restraining temporarily restoration of said film-advance control lever to the rest position thereof subsequent to release thereof by said interlock lever.

* * * * *